UNITED STATES PATENT OFFICE.

CARL F. KÜBLER, OF WILMERSDORF, GERMANY.

METHOD FOR OPENING OUT PLANTS OR LOOSENING THEIR FIBERS.

1,131,715.  Specification of Letters Patent.  Patented Mar. 16, 1915.

No Drawing.  Application filed November 9, 1912.  Serial No. 730,535.

*To all whom it may concern:*

Be it known that I, CARL F. KÜBLER, a subject of the Emperor of Germany, and resident of Wilmersdorf, near Berlin, Germany, have invented new and useful Improvements in a Method for Opening Out Plants or Loosening Their Fibers, of which the following is a specification.

The present invention relates to a new method for opening out plants or loosening the fibers of plants from the epidermis and other constituents, to produce a fiber material, that is well adapted to be spun.

There are a great number of fibers which heretofore could not be utilized in a commercial way, particularly for the finer or more delicate fabrics, owing to inability to fully loosen or free the fibers from the adhering incrustations without injury to the fibers themselves.

It is the object of the present invention to provide a method of treating plants and vegetables as above set forth whereby the fibrous material is loosened from its connection with the woody and fleshy part by precipitation of the adhesive substance in solution between the two bodies and this without injury to the fibers.

In the present embodiment of my invention, the method is carried out in the following manner: The raw bast ribbons, preferably in the form as stripped from the woody part of the plant, that is to say together with the outer skin (the epidermis) and the so-called flesh are separated more or less from the coarsest affixtures mechanically, are soaked in water or better still in a soap— or fat—emulsion until the bast-body is thoroughly and evenly soaked in the liquid and all hard parts have become soft. Then the liquid is drained off as much as possible and the bast-material is subjected to a freezing temperature in a natural or artificial way. It does not matter much, to what degree the material is cooled down, as long as care is taken, that the freezing point is attained at all parts of the material. When the goods are well cooled throughout (frozen all over) they are washed at the same time applying heat. This is preferably done by boiling the material in water, eventually adding some soap or Turkey-red oil or other suitable ingredients. When using certain kinds of fibers it may appear advisable to carry out this washing operation under pressure, say up to 5 atmospheres. The length of time the washing is carried on and the mode of this washing may vary at the different marks or qualities and must be ascertained empirically.

When submitted to the method described above the incrustated constituents loosen easily from the fibers and these will be laid bare and gathered in their natural state deprived of any gum, that has been present. Any fibers still adhering together will completely separate by making use of a suitable drying process and the result is a woolly or curly fibrous material, which can be used for the finest work and can be prepared for spinning purposes by the usual machines.

The addition of a soap emulsion to the soaking water may if desired be replaced by other fat emulsions, a fatty acid or even by a solution of any kind of salt.

I claim:

1. A method for opening out fibrous plants, consisting in subjecting the plants to a soaking operation adding a solvent to the soaking liquid, then to a freezing temperature and when frozen to a washing operation.

2. A method for opening out fibrous plants, consisting in subjecting the plants to a soaking operation adding a fatty emulsion to the soaking liquid, then to a freezing temperature and when frozen to a washing operation.

3. A method for opening out fibrous plants, consisting in subjecting the plants to a soaking operation, then to a freezing temperature and when frozen to a washing operation adding a solvent to the washing liquid.

4. A method of opening out fibrous plants, consisting in separating the skin and flesh of the plants from the coarser affixtures, then subjecting the material to a soaking operation in an emulsion, subjecting the material to a freezing operation, and then washing the material at the same time applying an artificial heat.

5. A method of opening out fibrous plants, consisting in soaking the material in an emulsion until the hard parts are soft, draining, and then artificially freezing the material throughout, washing the plants in the presence of an artificial heat and under pressure and finally adding an emulsion.

CARL F. KÜBLER.

Witnesses:
 WOLDEMAR HAUPT,
 HENRY HASPER.